United States Patent [19]

Hayes et al.

[11] 4,105,488

[45] Aug. 8, 1978

[54] RAW EDGE V-BELT BUILDING APPARATUS

[75] Inventors: Richard H. Hayes, Tallmadge; Lellan L. McFarland, Wadsworth; George L. Schrum, Tallmadge; Robert S. Vanderzee, Akron, all of Ohio

[73] Assignee: Akron Standard, Division of Eagle-Picher Industries, Inc., Akron, Ohio

[21] Appl. No.: 654,845

[22] Filed: Feb. 3, 1976

[51] Int. Cl.$^2$ ............................................. B29H 7/22
[52] U.S. Cl. .................................... 156/425; 156/137; 156/173; 156/188; 156/444; 242/26.45; 242/36; 242/45; 156/405 R
[58] Field of Search ............... 156/137, 139, 169, 171, 156/173, 184, 187, 188, 405, 406, 425, 433, 444; 242/45, 75.51, 37 R, 18 CS, 26.45, 26.3, 28, 29, 36, 43.1

[56] References Cited

U.S. PATENT DOCUMENTS

| | | | |
|---|---|---|---|
| 1,310,701 | 7/1919 | Hopkinson | 156/405 |
| 1,924,083 | 8/1933 | Carter et al. | 156/171 |
| 2,661,045 | 12/1953 | Huber | 156/171 |
| 2,665,757 | 1/1954 | Stevens et al. | 156/405 |
| 2,904,275 | 9/1959 | Selsted et al. | 242/75.51 |
| 3,051,362 | 8/1962 | Shook | 242/45 |
| 3,188,254 | 6/1965 | Huff et al. | 156/137 |
| 3,317,156 | 5/1967 | Hank | 242/75.3 |
| 3,526,368 | 9/1970 | Sanders | 242/45 |
| 3,539,415 | 11/1970 | Du Bosque | 156/397 |
| 3,551,252 | 12/1970 | Bishop et al. | 156/406 |
| 3,607,502 | 9/1971 | Marzocchi et al. | 156/171 |
| 3,647,126 | 3/1972 | Dieterich et al. | 156/405 |
| 3,650,490 | 3/1972 | Saunders | 242/75.3 |
| 3,852,141 | 12/1974 | Cross | 242/37 R |
| 3,864,188 | 2/1975 | Grawey et al. | 156/397 |
| 3,971,517 | 7/1976 | Matuura et al. | 242/26.3 |
| 3,994,445 | 11/1976 | Tarulli | 242/45 |

OTHER PUBLICATIONS

FEMCO Publication for Building V-Belts, Sep. 1966.

*Primary Examiner*—David Klein
*Assistant Examiner*—John E. Kittle
*Attorney, Agent, or Firm*—Wood, Herron & Evans

[57] ABSTRACT

Apparatus for building a raw edge V-belt carcass comprising, a drum about which differing plies of material are wrapped and about which a cord is helically wound. A servicer adapted to supply rubberized fabric is located adjacent the drum. A squeegee adapted to apply a gummy film mounted on a fabric liner is located adjacent the drum and has an applicator roll engageable with a partially formed carcass on the drum. A cord winder mechanism has a head mounted adjacent the drum and has a motor-driven screw for causing the head to move along the length of the drum. The screw motor is tied to the drum motor at a ratio which is infinitely adjustable within limits to vary the pitch of the cord as it is wound on the drum. The cord winder has a mechanism for detecting changes in the tension on the cord and for using that information to cause variations in the speed of a cord let-off roll so that the speed of the cord let-off roll matches the demand caused by the speed of the drum.

4 Claims, 8 Drawing Figures

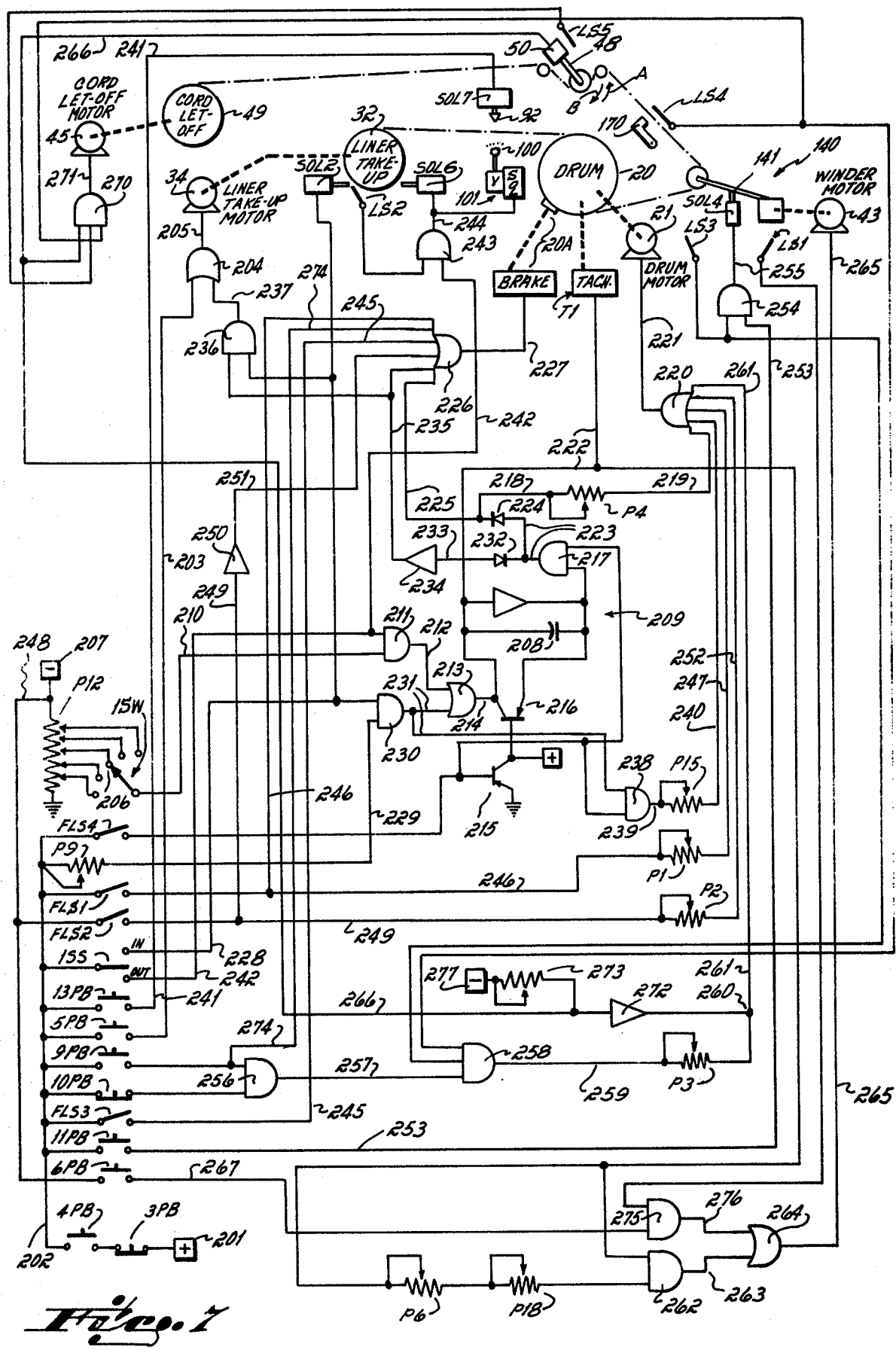

RAW EDGE V-BELT BUILDING APPARATUS

This invention relates to a raw edge V-belt building apparatus.

A raw edge V-belt is a V-belt which has been cut from a cylindrical carcass formed on a building drum as contrasted to a V-belt which has been individually formed on apparatus for that purpose, hence, the name raw edge V-belt.

The V-belt is built up out of a plurality of plies of rubberized fabric, a thin, gummy film and a very tough cord which is helically wrapped about the carcass. The thus formed carcass is vulcanized and cut into the individual V-belts.

The specific materials from which the carcass is made, the number of plies of each material and the quality of and pitch of the cord helix wrapped onto the carcass are all subject to considerable variation depending on the use to which the V-belt is to be put and a particular V-belt designer's choice.

There has been at least one type of V-belt building machine in use prior to the present invention which can be best characterized as being cumbersome. For example, when V-belts of different diameters are to be made, the building drums are changed to the particular desired diameter. When a drum diameter is changed, the transmission system for the cord winding mechanism must be changed in order to maintain a desired pitch of cord on the V-belt carcass. The prior art machine requires the use of change gears to effect the needed variations in the transmission to the cord winding head. These change gears add to the massiveness of the machine as well as the difficulty of making a change from one size drum to another.

An objective of the present invention has been to provide a V-belt building apparatus capable of placing materials on a building drum with greater accuracy than has been heretofore possible.

Another objective of the present invention has been to provide a V-belt building apparatus which is very versatile in accommodating itself to different types of V-belt designs and changes and which is easier to operate than prior apparatus.

The V-belt building apparatus of the present invention has a number of desirable features which enhance its versatility and the ease with which the necessary functions of applying the different types of material to a drum can be achieved.

The invention involves the utilization of a servicer in conjunction with the mechanisms which combine to perform the V-belt building functions. The servicer, heretofore used only in tire building, provides a convenient supply of differing types of materials, usually rubberized fabrics, which are used in a preselected sequence to build up the V-belt carcass.

Another feature of the machine is an improved squeegee unit, that being the unit by which the thin, gummy film is applied to the carcass. The squeegee includes an air blast nozzle which is used to blow a short flap of film up against the carcass after the major portion of the film has been wrapped about the carcass. The air blast eliminates an operation which heretofore has been an awkward one for the operator who normally stands at the opposite side of the drum from the squeegee unit and has been required to reach around the drum to push the flap, by hand, up against the carcass in order to avoid its folding back upon itself and sticking to itself.

The squeegee unit also has an electronic control unit to provide for the accurate wrapping of a single ply of gummy material through one revolution of the drum. To this end, the drum employs a tachometer whose signal is monitored, and when the signal indicates that one revolution has been achieved, the drum is precisely braked.

Another feature of the invention resides in the control of the cord let-off mechanism. First, the ratio of the cord winder head speed to drum rotation speed is controlled electronically and is easily adjustable so that any desired pitch of the cord on the carcass within the preselected range can be set and repeatedly achieved.

Further, very high cord winding speeds are achieved through the use of a motor driving the cord let-off roll at a rate demanded by the speed of the drum. The rate demanded by the drum is detected by a resolver mechanism connected to a cord loop, the resolver detecting changes in the cord loop which occur as drum speed changes. Through the use of this continuous monitoring of the drum demand and paying out of the cord in response to the demand, cord winding speeds as high as 1500 feet per minute can be achieved.

The resolver mechanism has an additional feature of causing the drum speed to be reduced when the drum speed in relation to the speed of the cord let-off roll becomes so great that the cord cannot be let out fast enough to satisfy the demand of the drum.

The resolver mechanism also provides for the reversal of the cord let-off motor in those situations where slack occurs in the cord as, for example, when the cord winding head, after completing a transverse across the drum, is returned to its start position. In another situation, the operator can reverse the drum motor, if necessary, and the cord let-off motor will reverse automatically to take up the slack in the cord occurring from the reversal of the drum.

The invention also provides means for capturing a loose cord and thus preventing the snarling of the cord in the event that the cord breaks.

Another feature of the cord winding head resides in the use of an air spring to hold the cord laying wheel against the carcass as the cord is being wound onto the carcass. The air spring permits the cord laying wheel to follow irregularities in the surface of the carcass and to react very quickly to deviations from a cylindrical surface in the carcass.

These and other features of the invention will become more readily apparent from the following detailed description taken in conjunction with the accompanying drawings in which:

FIG. 2A is an enlarged view of the applicator roll encircled in FIG. 2;

FIG. 7 is a schematic view of the electrical circuit for controlling the several functions of the apparatus.

GENERAL ORGANIZATION AND OPERATION

Figure 1:
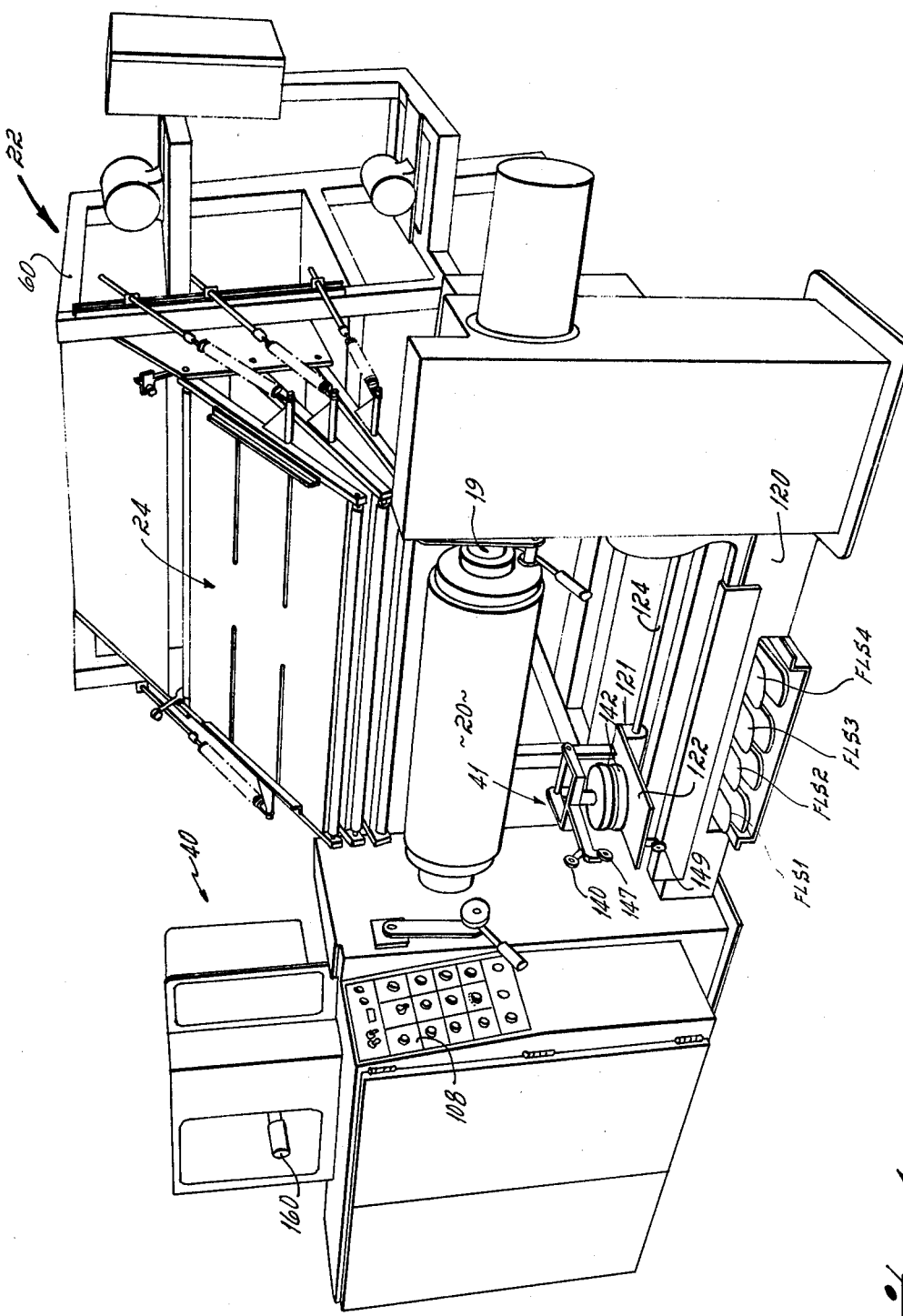
FIG. 1 is a perspective view of the apparatus.
Figure 2:
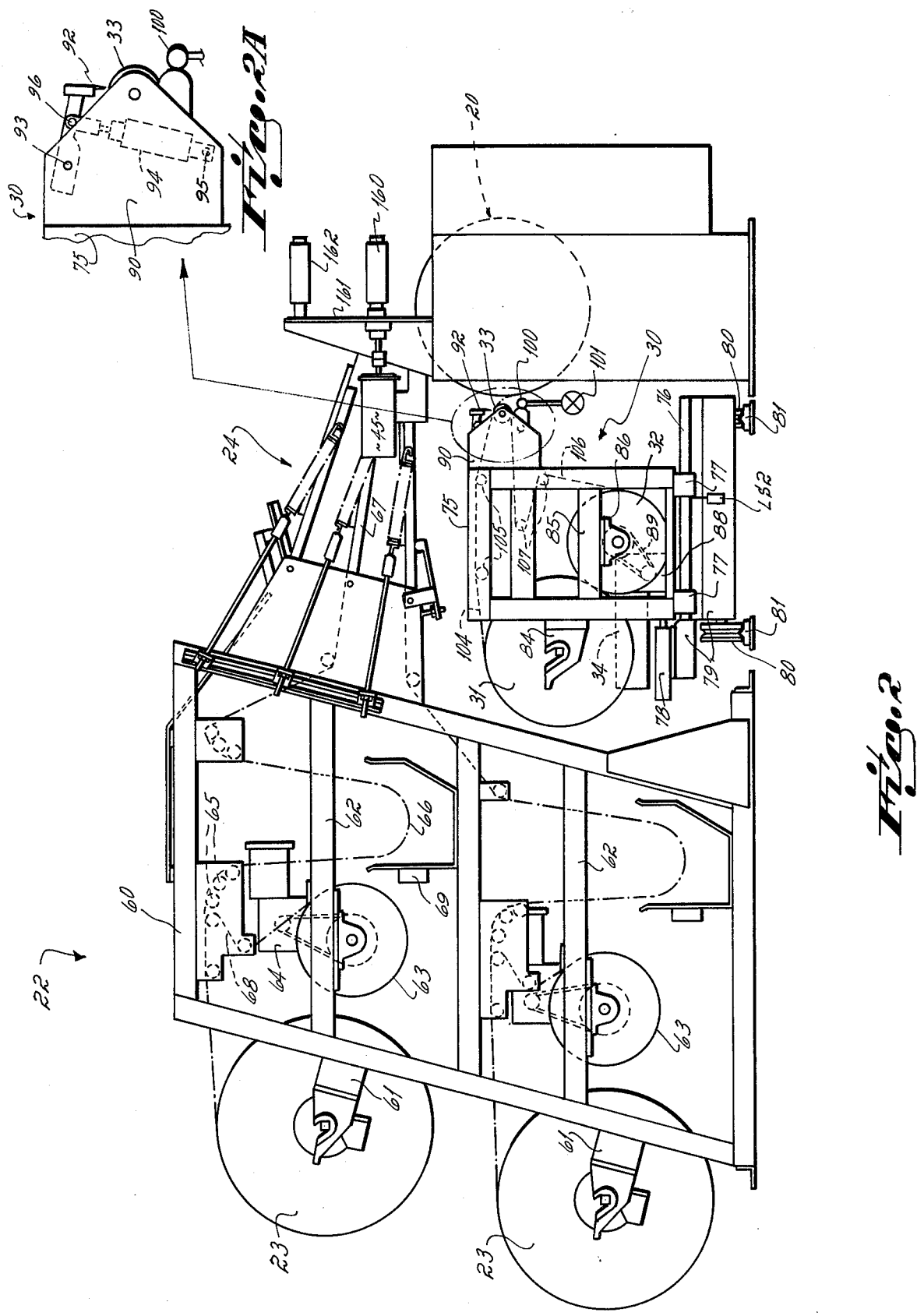
FIG. 2 is a side elevational view of the apparatus.
Figure 3:
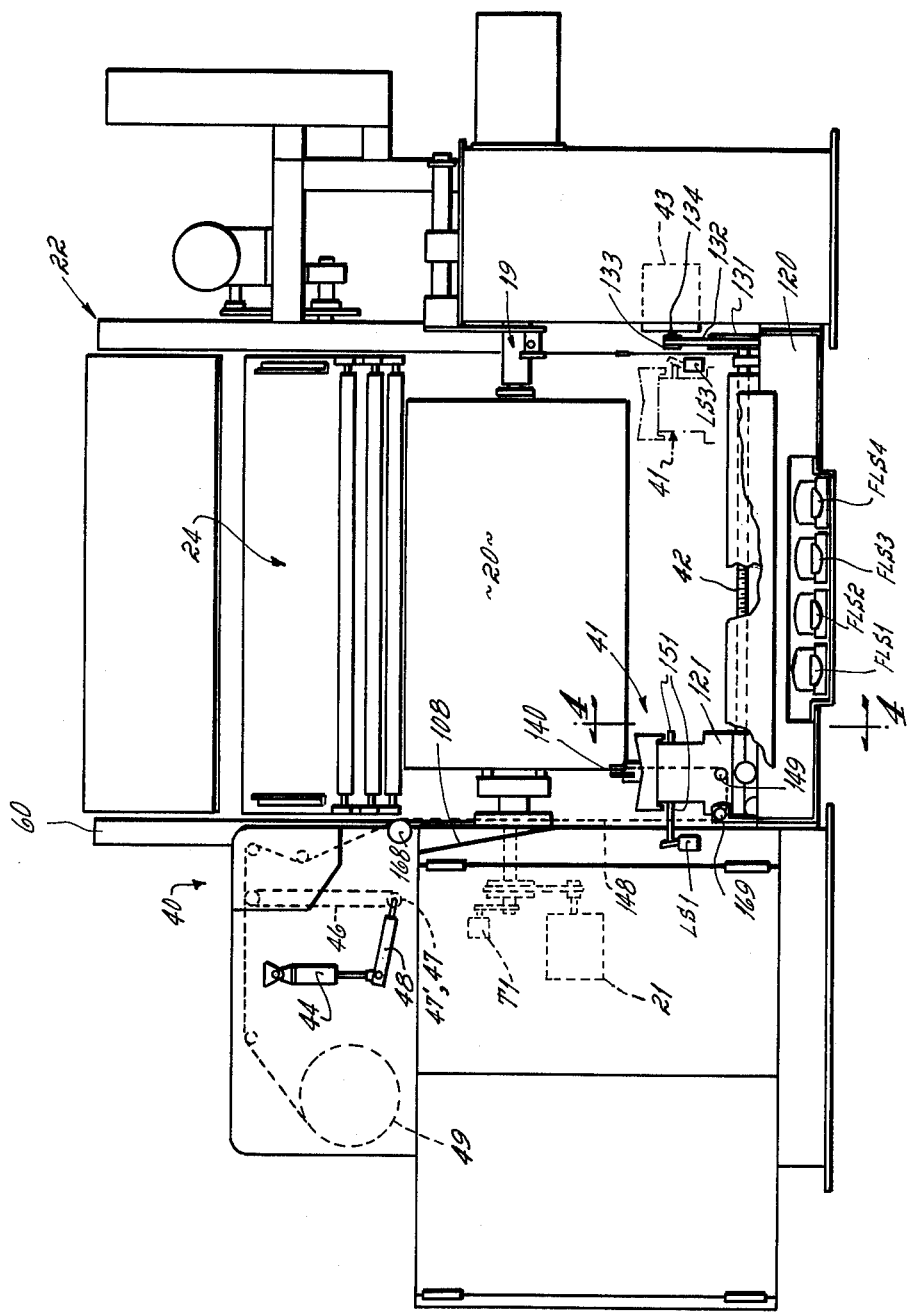
FIG. 3 is a front elevational view of the apparatus.

The raw edge V-belt building machine is illustrated in FIGS. 1-3. It includes as a central element a drum 20 which is driven by a 5 hp motor 21. The drum may be of any diameter as determined by the diameter of the V-belt which is to be built on the drum.

It is mounted on supporting structure 19 having means permitting its easy removal. Four foot pedals FLS-1–4 are used by the operator in conjunction with control circuitry to be described to control the operation of the drum. FLS-1 causes the drum to rotate continuously in a forward direction. It has two positions for high and low speeds. FLS-2 causes the drum to rotate in a reverse direction. FLS-3 is a normally-on brake pedal. When any of FLS-1, 2 or 4 is depressed to rotate the drum, the brake is automatically disengaged, and depressing FLS-4 will engage the brake as for an emergency stop. When none of FLS-1, 2 or 4 is depressed, the brake is on. Then depressing FLS-3 will disengage the brake for freewheeling rotation of the drum by the operator. FLS 4 causes the drum to rotate through a preselected number of revolutions (1 to 5) and automatically stop.

The drum has a tachometer T1 whose output is used for certain control functions, as will be described.

The V-belt is built by placing wraps of different types of materials on the drum 20 as it is rotated. After a cylindrical carcass of these materials has been built up, the carcass is vulcanized and then cut transversely to form a plurality of individual V-belts.

The apparatus includes three sources of supply of materials from which to construct the V-belt carcass. First is a servicer 22 of a type which is known in the tire building industry. The servicer has one or more supply rolls of stock 23 which are adapted to be fed along trays 24 to a position overlying the drum. The material is applied to the drum 20 while the drum rotates, and depending upon the revolutions through which the drum rotates, one to five plies of the stock are wrapped about the drum. The materials may be selected from a range of materials commonly used in building V-belts and are generally in the nature of a rubberized fabric.

As a second source of materials, a squeegee mechanism 30 is provided to apply to the partially built carcass a very thin film of gummy material which is about 0.030 inch thick. The squeegee mechanism includes a supply or let-off roll 31, a take-up roll 32 and an applicator roll 33. The film is supplied on a cotton or linen liner which is wound onto the take-up roll 32. The squeegee mechanism 30 is brought into engagement with the carcass on the drum and a 1 horsepower motor 34 driving the take-up roll 32 pulls the stock past the drum 20. The gummed film adheres to the sticky, rubberized fabric already applied to the drum and wraps around the carcass as the drum rotates. The liner is pulled away from the gummy material and wound upon the take-up roll 32 by the motor 34. The drum 20, in this instance, is actually driven by the force of the liner pulling past the drum, and therefore the speed of the drum is determined by the rate at which the liner is wound onto the take-up roll 32. The tachometer T-1 connected to the drum is used to determine when one revolution of the drum has been made and then to effect the braking of the drum.

A cord-applying mechanism 40 is also provided. The function of the cord-applying mechanism 40 is to wind a cord helix on the carcass. The cord may be fiberglass, metal, wire or a textile, depending upon the requirements of the V-belt. It is preferably less than ⅛ inch in diameter, and it is preferably applied at a pitch which is infinitely variable.

The cord-applying mechanism 40 has a head 41 from which the cord passes onto the drum and which is adapted to be moved close to the drum. The head is driven across the length of the drum by a screw 42 which is in turn rotated by a motor 43 at a rate which is at a preselected ratio to the drum speed, the ratio determining the pitch of the helical winding.

Figure 5:
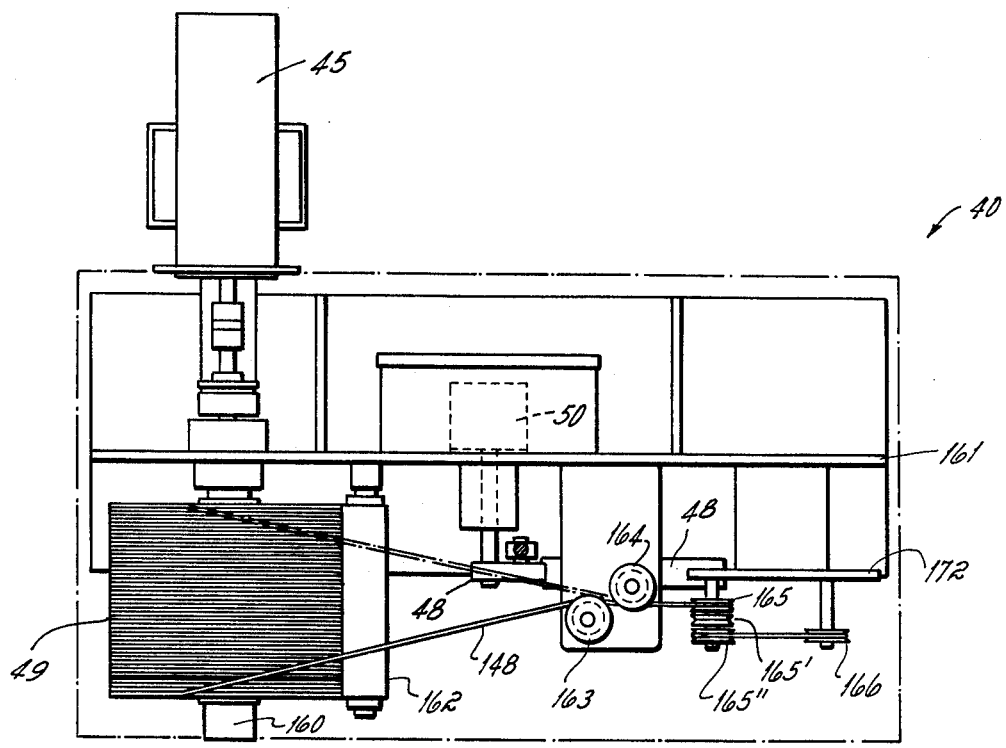
FIG. 5 is a top plan view of the cord let-off mechanism.
Figure 6:
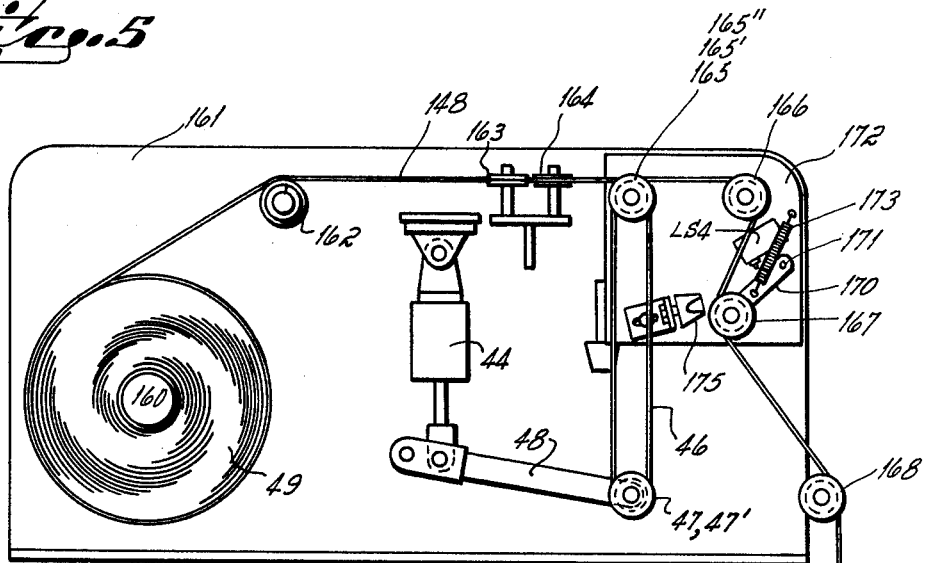
FIG. 6 is a front elevational view of the cord let-off mechanism.

Referring to FIGS. 3, 5 and 6, the cord is supplied from a let-off roll 49 which is in turn driven by a motor 45. The cord passes over a series of idler pulleys to the head 41. Included in the series of idler pulleys is a set of idler pulleys indicated at 47 (FIG. 3) causing two loops 46 in the cord. The idler pulleys 47 are secured to an arm 48 which is pivotally mounted, the arm being urged in a clockwise direction by an air-operated linear actuator including constant pressure air cylinder 44 capable of being adjusted. A resolver 50 is connected to the arm 48 and applies a signal to control the motor 45 of the let-off roll so that as the speed of the drum increases, thereby increasing the tension of the cord, the lever arm will rotate counterclockwise and transmit a signal from the resolver to the motor to increase the speed of the supply roll. Circuitry is also provided for causing rotation of the motor 45 in the opposite direction when a great deal of slack occurs in the cord. That occurs, for example, when a traverse of the drum by the head 41 is completed and the head 41 returns to its starting position as shown in FIG. 3. In returning to the starting position, slack will occur in the cord and will be taken up by the reverse rotation of the motor 45 on the let-off roll.

In the operation of the apparatus, the designer of the V-belt will decide on the materials to be applied, the number of wraps of each material to be applied and the order in which the materials are applied. The operator might start with several wraps or plies from a supply roll 23 on the servicer 22. The operator would apply the free end of the material to the drum and operator those controls, to be described below, to cause the drum to rotate. After the desired number of plies have been wrapped about the drum, the drum is stopped and the stock web is cut.

The one revolution of the gummy material would be applied by the squeegee. The operator would bring the squeegee mechanism 30 into position, start the controls, and one ply of gummy material would be wrapped about the partially formed carcass.

The operator might then apply a winding of the cord by bringing the head 41 into position, setting the desired pitch and operating the cord-applying mechanism, during which the head 41 moves along a path parallel to the axis of the drum while the cord is being applied to the drum at speeds up to about 1500 feet per minute. When the head 41 completes its excursion from left to right, as viewed in FIG. 3, it trips a limit switch to stop the drum. The cord is cut and the head is returned to its starting position at the left of the machine.

One or more of these operations is repeated until the carcass is built up as desired by the V-belt designer. The carcass is then vulcanized and cut transversely into a preselected number of V-belts.

The Servicer

The servicer has a frame 60 on which brackets 61 are mounted to receive stock and liner rolls. The frame 60 has horizontal beams 62 which support liner wind-up rolls 63 for each of the stock and liner rolls 23. The wind-up rolls are driven by motors 64. Idler rolls 65 are provided to cause the stock to follow a path having a single festoon 66 out to a servicer tray 24. The idler rolls 65 also cause the liner 68 to separate from the stock and follow a path to the wind-up roll 63. A photoelectric eye 69 monitors the festoon 66 and controls the wind-up roll motor 64 to pull a sufficient supply from the supply roll 23 to meet the demands of the V-belt building operation.

Squeegee Mechanism

The squeegee mechanism 30 has a frame 75 which is mounted on a pair of horizontal rods 76 by means of bearings 77 fixed to the frame 75. The frame is movable toward and away from the drum 20 through a suitable distance exceeding 2 inches to permit the squeegee to accommodate differing roll diameters and differing thicknesses of material built up on the drum at the time the squeegee is used. A double-acting piston and cylinder forming a ram 78 is mounted on a base 79 and is connected to the frame 75 to cause the frame to move toward and away from the drum. The base 79 is supported on wheels 80 which rest on tracks 81 which permit the suqeegee mechanism to be rolled to the side of the drum for the purpose of loading the stock, repairs and the like. A limit switch LS-2 is mounted on the base adjacent the frame 75 and is engageable by the frame when it moves to its retracted position remote from the drum 20.

The frame has brackets 84 to support the supply roll 31 of gummy stock and liner. The frame also has a beam 85 supporting journals 86 for the liner take-up roll 32. A motor 34 is mounted on the frame 75 and is connected through gear box 88 and a pulley belt drive 89 to the liner take-up roll 32 to drive the take-up roll.

Brackets 90 fixed to the frame 75 support an applicator roll 33. Immediately above the applicator roll is a hot knife 92 which is pivoted at 93 to the brackets 90. The hot knife is actuated by a double-acting ram 94 which is pivoted to the bracket 90 at 95 and to the hot knife at 96. The hot knife extends along the length of the applicator roll 33 and when moved into engagement with the applicator roll cuts cleanly through the gummy stock.

An elongated air nozzle 100 is mounted on the brackets 90 and extends along the length of the applicator roll 33. It is connected to a source of air under pressure (not shown) through a valve 101. The function of the nozzle 100 is to direct a blast of air upwardly past the applicator roll 33 as the hot knife 92 cuts the film so as to blow the short flap (approximately 4 inches) upwardly against the drum. Thus, the gummy film is prevented from falling against itself after it has been cut and avoids the necessity of the operator awkwardly reaching between the applicator roll and the drum to move that flap of gummy material against the drum.

The liner and stock indicated at 104 pass over two idler rolls 105 to the applicator roll 33. The stock will move against the carcass on the drum 20 and will be separated from the liner by its greater adhesion to the partially formed carcass, and it will be wrapped around the carcass by the rotation of the drum. The liner indicated at 106 passes over idler rolls 107 to the take-up roll 32.

In the operation of the squeegee, the drum motor has a low torque applied to it to keep it from freewheeling. The operator operates an IN-OUT control button on a control panel 108 (FIG. 1) to IN to energize the ram 78 to move the squeegee into position with the applicator roll 33 in engagement with the drum. The air pressure on the ram 78 is maintained during the operation to hold the applicator roll snugly against the drum. The air pressure obviously is not so great as to cause damage to either the squeegee or drum mechanism.

A pedal FLS-4 is operated to energize the motor 34 for the liner take-up roll 32 to cause the roll to rotate counterclockwise, pulling the liner across the applicator roll 33. The engagement of the applicator roll 33 with the drum 20 causes the drum to rotate. During approximately 4 inches of rotation, no stock is applied because from the previous operation the stock was cut approximately 4 inches away from the point at which the applicator roll 33 engages the drum. As the liner continues to be pulled onto take-up roll 32, the gummy stock moves into engagement with the rubber on the partially built up carcass and begins to move in a counterclockwise direction as the drum is driven by the rotation of the applicator roll 33.

A control circuit, which receives a signal from the drum tachometer T-1, has been preset for one revolution of the drum when the apparatus is in the squeegee mode of operation. When the drum is rotated one revolution as determined by the tachometer, the motor 34 to the take-up roll 32 is deenergized and a brake 20A (FIG. 7) is applied to the drum. The operator depresses a cut stock push button on the control panel 108 to energize the ram 94, thereby bringing the hot knife 92 into engagement with the stock on the applicator roll to cut the stock transversely along its length. Release of the cut stock switch permits the ram 94 to move the knife to its inoperative position.

The operator then reverses the operation of the IN-OUT control button to OUT and energizes the ram 78 in the opposite direction to cause the frame 75 to move away from the drum 20. Simultaneously with the reversal of the air to the ram 78, the OUT switch energizes a solenoid to valve 101 on the air nozzle, admitting air to the nozzle. Thus, as soon as the frame 75 starts to back away from the drum 20, a blast of air drives the unapplied flap of stock upwardly against that small portion of the circumference of the carcass 20 to which no gum was applied. When the frame reaches its retracted position, it engages limit switch LS-2 to energize a solenoid which operates the valve on the ram to stop the ram and operates a valve on the air blast to shut off the air to the nozzle 100.

Cord Winder

As described above, the cord winder is apparatus for winding a cord in a helix about a portion of a carcass built up on the drum. In accordance with the present invention, it includes two main sections or mechanisms. The first is the winder head 41 and the means by which it is caused to move parallel to the axis of the drum in a predetermined speed ratio to the speed of the drum so as to wind onto the carcass a preselected cord pitch. The second mechanism is the cord let-off mechanism wherein the cord let-off roll 49 is driven at a speed which is electronically regulated to accommodate the speed of the drum. The mechanism is also designed to reverse the let-off roll to take up slack in the cord, and it is designed to accommodate breaking of the cord.

Figure 4:
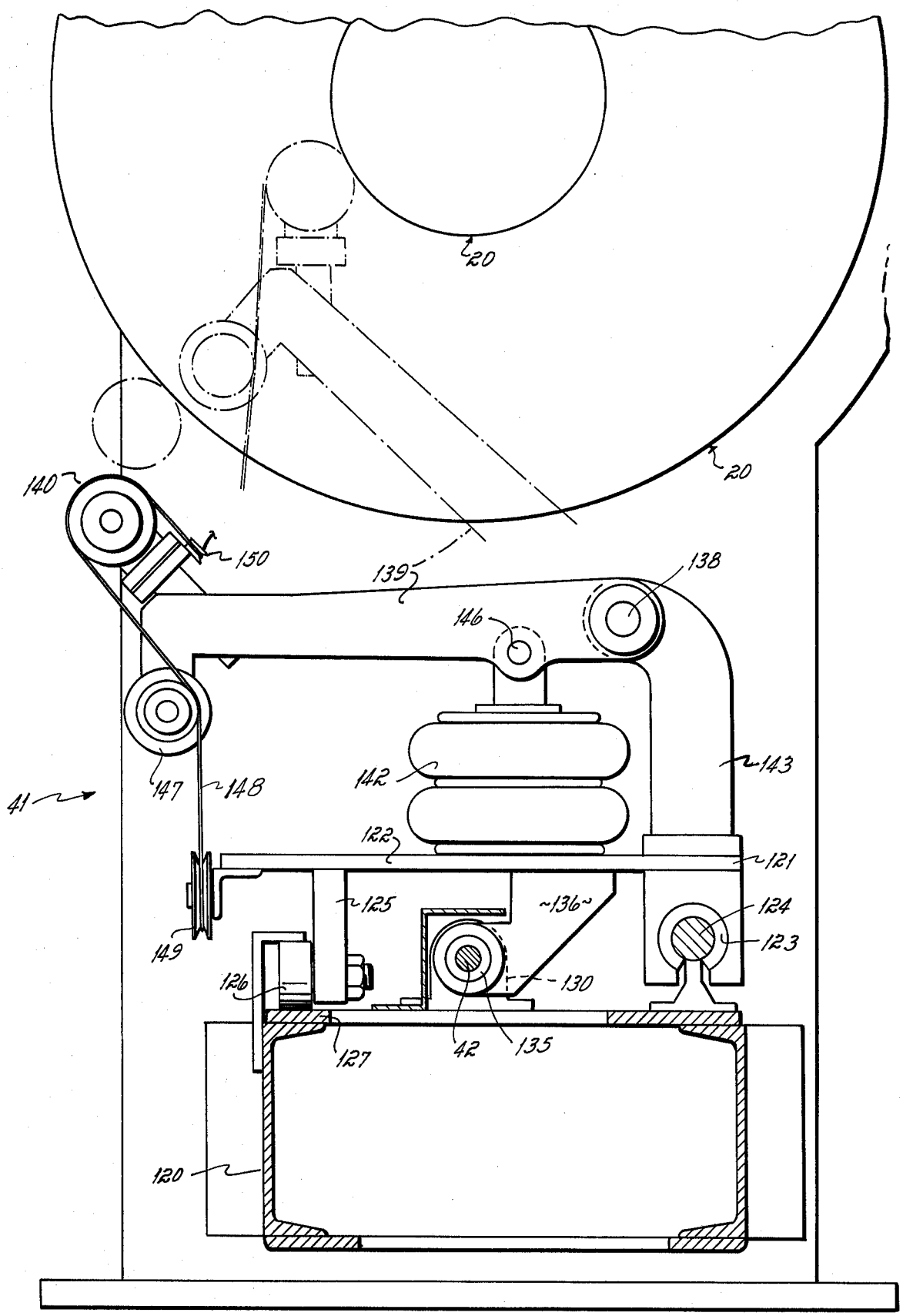
FIG. 4 is a cross-sectional view taken along lines 4—4 of FIG. 3.

The winder head 41 is shown in FIGS. 3 and 4. It includes a base 120 on which a carriage 121 is mounted for movement in a direction parallel to the axis of the drum 20. The carriage includes a plate 122 which supports a conventional ball bushing 123 which is in sliding engagement with a cylindrical bar 124 fixed to the base. On the other side of the base is a bracket 125 to which a roller 126 is rotatably mounted, the roller being in rolling contact with a plate 127 forming the upper surface of the base 120. The carriage is thus supported by the ball bushing and bar on one side and by the roller 126 and engaging plate 127 on the other side. The feed screw 42 is journalled in the base in pillow blocks 130 at each end of the base. At the right side of the base, as viewed in FIG. 3, the screw has a fixed pulley 131 which is connected by a timing belt 132 to a pulley 133 fixed to the shaft 134 of the 1 horsepower motor 43. The screw 42 is threaded in a nut 135 (FIG. 4) which is fixed to a screw nut holder 136 mounted on the carriage 121.

Rotation of the motor 43 causes the screw to rotate through the timing belt and pulley system 131–133. Rotation of the screw causes the carriage to move across the drum in a path parallel to the axis of the drum.

A cord-laying wheel 140 which engages the carcass to effect the winding of the cord onto the carcass is mounted on an arm 139. The arm is pivoted at 138 to a post 143 fixed to the carriage 121. An air spring 142 has one end mounted on the carriage 121 and the other end pivotally secured at 146 to the arm 139. As shown in broken lines, inflation of the air spring causes the arm to rotate upwardly, bringing the laying wheel 140 into engagement with the carcass. The angular movement permitted by the mechanism is such as to enable the laying wheel to engage any size drum from a maximum diameter of 24 inches down to a drum of minimum diameter of 8 inches.

The arm also carries an idler pulley 147 over which the cord 148 passes. The pulley 147 maintains the cord in alignment with a pulley 149 rotatably mounted on the carriage. A small clip 150 is secured to the arm 139 adjacent the laying wheel to receive and hold the end of the cord between winding operations after it has been cut from the previously wound carcass.

Limit switches LS-1 and LS-3 are mounted at each end of the base 120 and are engageable by rods 151 mounted on each side of the carriage 121. At the end of a winding excursion across the base, LS-3 will be operated to stop the winding operation, as will be described below. Thereafter, the carriage is returned to its starting position. When the carriage reaches its starting position, LS-1 is operated to deenergize the motor 43.

Referring to FIGS. 5 and 6, the cord 148 is fed to the winder head 41 from the let-off roll 49 which is mounted on a shaft 160 journalled in a vertical plate 161. The shaft is connected to a one horsepower DC motor 45 and operated in a manner to be described. The cord 148 passes from the supply roll 49 over an idler roll 162. From the idler roll 162 the cord passes between two pulleys 163, 164 mounted on vertical axes, the pulleys 163, 164 guiding the cord 148 onto a pulley 165. This arrangement of pulleys and idler rolls permits the cord to be directed in a straight line onto the pulley 165 even though the cord might be coming off of any one of a number of locations along the axis of the roll 49 as indicated by the broken lines in FIG. 5. The cord then passes from the pulley 165 to an idler pulley 47 on the pivotal arm 48. The cord makes two loops by passing to the pulley 47 back to a pulley 165' on the axis of pulley 165 to a pulley 47' on the same axis as the pulley 47 and back to a pulley 165" on the same axis as the pulley 165. From pulley 165" the cord passes over a pulley 166 past a cord brake pulley 167, over pulley 168 and down to pulley 169 fixed to the winder head base 120. From the pulley 169 the cord passes to the pulley 149 on the carriage 121.

The arm 48 is biased downwardly by an air pressure device 44 (Bellofram) to which air is supplied through a pressure regulator to maintain a constant and uniform pressure on the arm 48.

The pulley 167 is mounted on an arm 170 which is pivoted at 171 to a plate 172 mounted on and parallel to the plate 161. A tension spring 173 connected between the plate 172 and the arm 170 urges the arm upwardly in a clockwise direction as viewed in FIG. 6. Adjacent the pulley 167 is an elastomeric brake pad 175 which is fixed to the plate 172. The normal tension on the cord 148 causes the arm 170 to be pulled downwardly away from the brake pad 175. However, when the tension is relieved, as by a cord breaking, the spring 173 pulls the arm 170 in a clockwise direction to jam the pulley and the cord against the brake pad 175 to hold the cord there until the break can be repaired. A limit switch LS-4 is mounted on the plate 172 and is engageable by the arm 170 when it swings to a braking position to initiate the operation of the control functions which will stop all of the motors involved in the winding of the cord onto the drum.

In the operation of the winder apparatus, the operator makes a setting in the controls to determine the pitch of the cord on the carcass. Effectively, this setting fixes the ratio of the speed of the motor 43 which drives the winder head screw 42 to the speed of the motor 21 which drives the drum. The operator pushes an engage button to cause air spring 142 to inflate, bringing the cord-laying wheel 140 into engagement with the carcass. After removing the free end of the cord from its clip, the operator presses a push button to cause the drum to rotate at a preselected high speed. As the drum rotates, the screw moves the carriage in an axial direction along the length of the drum to cause the cord to wind the carcass on the drum.

The winding of the cord on the carcass causes a tension to be applied to the cord which tension is detected by the resolver 50 connected to the pivotal arm 48. The resolver feeds a signal to the control circuit for the motor 45 on the let-off roll 44 to cause the let-off roll to rotate at a speed which is sufficient to keep up with the requirements of winding the cord on the carcass.

The arm 48 has about a 45° arc with an arc A of 30° above a neutral position and an arc B of 15° below a neutral position. When the arm 48 is in the 30° arc A, the let-off roll is driven in a forward direction at a speed determined by the position of the arm in the arc A. As the arm moves upwardly due to the increased tension, the motor is driven more rapidly. As the arm moves downwardly toward the neutral position, the motor is driven more slowly. Thus, the motor 43 during normal operation is controlled to maintain a substantially uniform tension on the cord regardless of the speed of the drum motor. If the arm moves upwardly to about 25° of the 30° arc, some of the signal from the resolver 50 is applied to the drum to slow the drum down.

When the winding head 41 reaches the end of its excursion and engages the limit switch LS-3, the motors are stopped and the operator cuts the cord and ties an end to the clip 150. The winder head is backed away from the carcass by deflating the air spring 142 and is then returned to its original position at the left side of the apparatus by reversing the direction of the motor 43. As the winder head moves toward the left side of the apparatus, tension in the cord is relieved and the arm 48 swings downwardly into the 15° arc B. The resolver, detecting that position of the arm, reverses the direction of the motor 45 so as to take up the slack in the cord and wind it back on the let-off roll 49. When the winder head reaches its start position, it engages limit switch LS-1 which is operative to deenergize the winder motor 45.

Further, if, during the winding operation, the operator for some reason wishes to unwind a portion of the cord previously wound, the operator can reverse the drum motor and as the cord backs off the carcass, the resolver detecting the slack in the cord will reverse the direction of the let-off motor 45 to take up the slack.

When the arm 48 reaches the neutral position, it activates a switch to deenergize the resolver motor. This will occur at the end of a winding traverse when the drum motor and winder head are stopped. In that condition the resolver motor continues to run for the brief time that it takes for the air cylinder 44 to drive the arm to the zero position. When the winder head 41 is returned to its start position, the air cylinder 44 will drive the arm into the B arc because of the slack occurring in the cord, and the motor 45 will operate in the reverse direction as described. When the winder head reaches its start position, the resolver motor will continue to run until it applies sufficient tension to the cord to pull the arm up to the zero position, at which point the motor 45 will be deenergized.

Control Circuit

FIG. 7 illustrates the control system for the apparatus. The control system includes operator controls and transducers of conventional construction and an interconnecting logic circuit, whose function will now be described in conjunction with the sequences of steps which comprise a raw edge V-belt building operation.

Positive voltage source 201 supplies power for control and operation of the various elements of the apparatus via line 202. Line 202 includes series-connected normally closed emergency stop push button 3PB and normally open restart push button 4PB. The operator depresses restart push button 4PB to energize the control system.

With the control system energized, the operator will first thread a web of gummy film and liner in the squeegee mechanism. To facilitate threading the squeegee mechanism, the operator shifts the carriage to its rearmost position away from drum 20 and rolls the squeegee mechanism out to the side of the apparatus on transverse tracks 81.

With the squeegee mechanism so positioned, the operator threads the web through the squeegee mechanism and attaches it to liner take-up roll 32. The operator then depresses push button 5PB. Thus, the operator connects positive voltage source 201 to liner take-up motor 34 via line 202; push button 5PB; line 203; OR gate 204 and line 205 to drive liner take-up motor 34, thereby securing the web to liner take-up roll 32.

After the operator jogs liner take-up motor 34 a sufficient number of times to assure him that the web has been secured around liner take-up roll 32, he returns the squeegee mechanism to its normal position in alignment with drum 20. The operator mounts a drum of the desired diameter on the drum stand and secures it in position. In this condition, the apparatus is ready for construction of raw edge V-belt.

As indicated above, the particular sequence of raw edge V-belt building operations is established by the designer of the V-belt. With that understanding, the following description of the sequence of operations is exemplary only and is subject to variations which depend upon the particular design of the V-belt.

The operator first pulls rubberized textile fabric onto drum 20 and secures the free end to the drum. The operator then programs drum motor 21 for the desired number of wraps of rubberized textile fabric, for example, three. The operator can accomplish programming of drum motor 21, for example, by shifting selector switch 1SW to tap 206 of potentiometer P12 which corresponds to three rotations of drum 20. Thus, the operator connects negative voltage source 207 to the charging circuit for initial condition capacitor 208 of integrator 209 via potentiometer P12; switch 1SW; line 210; AND gate 211, AND gate 211 being gated by switch 1SS when switch 1SS is in its normal OUT position; line 212; OR gate 213; and line 214. The operator then depresses foot pedal FLS4. Foot pedal FLS4 enables transistor switch 215, thereby disabling transistor switch 216. While transistor switch 216 is disabled, the charging circuit for initial condition capacitor 208 is open. Foot pedal FLS4 also gates the output of integrator 209 to drum motor 21 via AND gate 217; line 223; diode 224; line 218; potentiometer P4; line 219; OR gate 220; and line 221 to drive drum motor 21 at a speed which the operator determines by adjustment of potentiometer P4.

As drum 20 rotates, tachometer T1 generates a positive voltage which is input to integrator 209 via line 222. Integrator 209 operates in a well-known manner to integrate the signals from tachometer T1. When drum 20 completes the exemplary three rotations, integrator 209 will have a zero output, and drum motor 21 will stop.

The output of integrator 209 also connects via AND gate 217; line 223; diode 224; line 225; OR gate 226; and line 227 to schematically represented normally-on drum disc brake 20A. Thus, when the operator depresses foot pedal FLS4 to rotate drum 21, for example, three rotations, integrator 209 releases drum disc brake 20A. When drum 20 completes the exemplary three rotations, integrator 209 will have a zero output and drum disc brake 20A will be reapplied to hold drum 20 in the position which it achieves.

In the next operation the operator applies a single wrap of gummy film to the rubberized textile fabric, or carcass, on drum 20.

The operator first shifts switch 1SS to IN. Thus, the operator connects positive voltage source 201 to solenoid SOL2 via line 202; switch 1SS; and line 228. Solenoid SOL2 operates a valve which applies air pressure to a ram which drives the squeegee mechanism toward drum 20 until the web on applicator roll 33 engages the carcass previously wrapped around drum 20. The ram remains under pressure during application of the gummy film to the carcass. The operator automatically programs liner take-up motor 34 for one wrap of gummy film when he shifts switch 1SS to IN. Thus, the operator connects positive voltage source 201 to the charging circuit for initial condition capacitor 208 of integrator 209 via potentiometer P9; line 229; AND gate 230, AND gate 230 being gated by switch 1SS when switch 1SS is in its IN position; line 231; OR gate 213; and line 214. The operator then depresses foot pedal FLS4. Foot pedal FLS4 enables transistor switch 215, thereby disabling transistor switch 216. While transistor switch 216 is disabled, the charging circuit for initial condition capacitor 208 is open. Foot pedal FLS4 also gates the output of integrator 209 to liner take-up motor 34 via AND gate 217; line 223; diode 232; line 233; inverter 234; line 235; AND gate 236, AND gate 236 being gated by switch 1SS when switch 1SS is in its IN position; line 237; OR gate 204; and line 205 to drive liner take-up motor 34. Liner take-up motor 34 will rotate liner take-up roll 32; and rotation of applicator roll 33 and drum 20 in opposite directions result from take-up of the liner on liner take-up roll 32.

As drum 20 rotates in an opposite direction to liner take-up roll 32, tachometer T1 generates a negative voltage which is input to integrator 209 via line 222. Integrator 209 integrates the signal from tachometer T1. When drum 20 completes one reverse rotation, integrator 209 will have a zero output and liner take-up motor 34 will stop.

The output of integrator 209 also connects via AND gate 217; line 223; diode 232; line 233; inverter 234; line 235; OR gate 226; and line 227 to drum disc brake 20A. Thus, when the operator depresses foot pedal FLS4 to rotate drum 20 one reverse rotation through frictional contact between the carcass and the web and applicator roll 33, integrator 209 releases drum disc brake 20A. When drum 20 completes one reverse rotation, integrator 209 will have a zero output and drum disc brake 20A will be reapplied to hold drum 20 in the position which it achieves.

When the operator depresses foot pedal FLS4 to apply gummy film, he also applies a small torque to drum 20 by drum motor 21. Thus, the operator connects positive voltage source 201 to drum motor 21 via line 202; potentiometer P9; AND gate 230; line 231; AND gate 238, AND gate 238 being gated by foot pedal FLS4; line 239; potentiometer P15; line 240; OR gate 220; and line 221 to drive drum motor 21 to apply low torque to drum 20, thereby alleviating slippage during gum applications. The operator determines the amount of torque by adjustment of potentiometer P15.

After gummy film has been substantially applied (except for the flap remaining between the surface of the carcass and the liner and applicator roll 33), the operator depresses push button 13PB. Thus, the operator connects positive voltage source 201 to solenoid SOL7 via line 202; push button 13PB; and line 241. Solenoid SOL7 operates a valve which applies air pressure to a ram which moves hot knife 92 into engagement with the liner. Hot knife 92 melts the gummy film at the cut. When the operator releases push button 13PB, he deenergizes solenoids SOL7. The ram returns to its original position, and hot knife 92 raises.

The operator then shifts switch 1SS to OUT. Thus, the operator connects positive voltage source 201 to solenoid SOL6 via line 242; AND gate 243, AND gate 243 being gated by normally open limit switch LS2; and line 244. Solenoid SOL6 operates a valve which applies air pressure to the ram which causes the squeegee mechanism to return to its position remote from drum 20. Simultaneously with the retreat of the squeegee mechanism from drum 20 a solenoid operated valve 101 is energized to permit the passage of air to nozzle 100 to cause a blast of air to impinge against the loose flap between the liner and applicator roll 33 and drum 20 and to throw the flap upwardly against the carcass. When the squeegee mechanism returns to its remote position, it engages limit switch LS2 which disables AND gate 243, and solenoid SOL2 and solenoid operated valve 101 are deenergized, thereby terminating rearward movement of the squeegee mechanism and the air blast.

After applying gummy film to the carcass, the operator uses a hand tool, or stitches, to secure the flap to the carcass. To facilitate access to the stitching area, the operator depresses foot pedal FLS3. Thus, the operator connects positive voltage source 201 to drum disc brake 20A via line 202; foot pedal FLS3; line 245; OR gate 226; and line 227, thereby releasing drum disc brake 20A and placing drum 20 in a freewheeling mode. The operator rotates drum 20 by hand to bring the flap of the applied gummy film into a position where he can conveniently stitch the flap to the carcass. Alternatively, the operator can jog drum motor 21 to rotate drum 20 to bring the flap of the applied gummy film into a position where he can conveniently stitch the flap to the carcass by depressing foot pedal FLS1 or FLS2 which jog drum motor 21 in a forward or reverse direction, respectively. Thus, the operator can connect positive voltage source 201 to drum disc brake 20A via line 202; foot pedal FLS1; line 246; OR gate 226; and line 227, thereby releasing drum disc brake 20A. Simultaneously, the operator connects positive voltage source 201 to drum motor 21 via line 202; foot pedal FLS1; line 246; potentiometer P1, line 247; OR gate 220; and line 221 to jog drum motor 21 in a forward direction at a rotation speed which the operator determines by adjustment of potentiometer P1. Otherwise, the operator can connect negative voltage source 207 to drum disc brake 20A via line 248; foot pedal PLS2; line 249; inverter 250; line 251; OR gate 226; and line 227, thereby releasing drum disc brake 20A. Simultaneously, the operator connects negative voltage source 207 to drum motor 21 via line 248; foot pedal FLS2; line 249; potentiometer P2; line 252; OR gate 220; and line 221 to jog drum motor 21 in a reverse direction at a rotation speed which the operator determines by adjustment of potentiometer P2.

In the next step the operator applies a winding of cord to the gummed carcass on drum 20. The operator first depresses push button 11PB. Thus, the operator connects positive voltage source 201 to solenoid SOL4 via line 202; line 253; AND gate 254, AND gate 254 being gated by normally closed limit switch LS3; and line 255, to energize solenoid SOL4. Solenoid SOL4 operates a valve which applies air pressure to air spring 141. Air spring 141 raises cord winding head 140 upwardly against the gummed carcass on drum 20 and holds it in a position of engagement throughout the cord winding operation. The operator unhooks the free end of the cord from clip 150 and attaches it to the gummed carcass in preparation for the cord winding operation.

The operator then adjusts potentiometers P6 and P18 which provide fine and coarse adjustment of the ratio of winder head motor 43 and drum motor 21 rotation speeds. The adjustment on potentiometers P6 and P18 determine the pitch of the cord as it is wound around the gummed carcass. The operator also adjusts potentiometer P3 which provides adjustment of drum motor 21 rotation speed for the cord winding operation, therefore, the cord winding rate.

The operator initiates cord winding when he depresses push button 9PB. Thus, the operator connects positive voltage source 201 to drum motor 21 via line 202; push button 9PB; AND gate 256, AND gate 256 being gated by normally closed run stop push button 10PB; line 257; AND gate 258, AND gate 258 being gated by normally closed limit switch LS3; switch LS4; line 259; potentiometer P3; mode 260; line 261; OR gate 220; and line 221 to drive drum motor 21. The operator also connects positive voltage source 201 to drum disc brake 20A via line 202; push button 9PB; line 274; OR gate 226; and line 227, thereby releasing brake 20A.

Tachometer T1 connects to winder motor 43 via line 222; potentiometer P6; potentiometer P18; AND gate 262, AND gate 262 being gated by push button 11PB; line 263; OR gate 264; and line 265. Thus, when drum 20 begins to rotate, resulting positive voltage which tachometer T1 generates drives winder motor 43.

Resolver 50 connects to cord let-off motor 45 via line 266; AND gate 270, AND gate 270 being gated by normally closed limit switch LS4, and normally open limit switch LS5 and line 271. Thus, when tension of the cord increases during cord winding as winder head 140 traverses beneath drum 20 and the loop in the cord causes arm 48 to swing into the A arc, resolver 50 generates a positive voltage which drives cord let-off motor 45 to unwind cord from cord let-off spool 49. As the rotation speed of drum motor 21 increases to the preselected rotation speed, the tension of the cord will tend to increase; but, as the tension increases, arm 48 will swing through a larger arc, and resolver 50 will generate a greater positive voltage, thereby driving cord let-off motor 45 at an increased speed to maintain a supply of cord to winder head 140 at the rate demanded.

If drum 20 rotation speed increases to the point that cord let-off motor 45 cannot supply cord at the rate demanded, arm 48 will swing to the upper portion of arc A. Resolver 50 connects the node 260 via line 266 and amplifier 272. Amplifier 272 is negatively biased off by potentiometer 273 which is connected to negative voltage source 277. The adjustment on potentiometer 273, while opposite in sign, is equal in magnitude to the positive voltage which resolver 50 generates when arm 48 has its maximum allowable displacement through arc A. If arm 48 reaches its maximum allowable displacement, resolver 50 generates a sufficient positive voltage to drive amplifier 272 and the output of amplifier 272 subtracts from the positive voltage at node 260, which drives drum motor 21, thereby slowing drum motor 21 rotation speed to the point that cord let-off motor 45 can supply cord at the rate demanded.

In the event of a cord break during cord winding, cord brake arm 170 will swing upwardly and engage limit switch LS4. Limit switch LS4 disables AND gate 258 and AND gate 270, and the apparatus involved in the cord winding operation will stop.

When winder head 140 completes its traverse beneath drum 20, it engages limit switch LS3. Limit switch LS3 disables AND gate 258, and cord winding ceases. Limit switch LS3 also disables AND gate 254, and solenoid SOL4 is deenergized. Solenoid SOL4 valves air spring 141, and winder head 140 retracts. When winder head 140 reaches its lowermost position, the operator cuts the cord and secures the free end to clip 150.

The operator then depresses push button 6PB. Thus, the operator connects negative voltage source 207 to winder motor 43 via line 248; push button 6PB; line 267; AND gate 275, AND gate 275 being gated by limit switch LS1; line 276; OR gate 264; and line 265 to drive winder motor 43 to return winder head 140 to its original position. Upon reaching its original position, winder head 141 engages limit switch LS1. Limit switch LS1 disables AND gate 275, and winder motor 43 stops.

As winder head 141 returns to its original position, it carries the free end of the cord with it, thereby creating slack in the cord loop. Arm 48, therefore, swings into the B arc, and resolver 50 generates a negative voltage which drives cord let-off motor 45 to wind cord onto cord let-off spool 49. When winder head 141 reaches its original position, cord let-off motor 45 will apply a sufficient tension to the cord to bring arm 48 to its neutral position. Arm 48 engages limit switch LS5, which disables AND gate 270, and cord let-off motor 45 stops.

After applying cord to the gummer carcass on drum 20, the operator may again apply plies of rubberized textile fabric from the servicer and proceed in the manner previously described until the carcass is built up with plies of rubberized textile fabric, gummy film and cord in accordance with the V-belt design. The operator then removes drum 20 and the carcass thereon for further processing, including vulcanizing.

Having described our invention, we claim:

1. In a raw edge V-belt building apparatus including a rotatable drum around which a V-belt carcass is built, a squeegee mechanism for applying a thin, gummy film to said carcass comprising, means for mounting a supply roll of film on a liner web, a liner take-up roll, means for driving said liner take-up roll, an applicator roll engageable with said drum, said film and liner passing from said supply roll through a path between applicator roll and said drum and said liner passing from said applicator roll to said take-up roll whereby the movement of said liner and film past said drum causes said film to be deposited on said drum as said drum is rotated, a heated knife mounted above said applicator roll and extending across the length of said applicator roll, means for moving said knife into engagement with said applicator roll after said film has been applied to said drum, an air nozzle extending across the length of said applicator roll and positioned below said applicator roll, and means for applying a jet of air from said nozzle to said film after said film has been cut by said knife to drive a flap of said film against the carcass on said drum.

2. Apparatus for building a raw edge V-belt carcass comprising, a drum for receiving plies of material and wrapping them about said drum to form a cylindrical carcass, means for rotating said drum, a cord let-off mechanism for applying a cord in a helix around said carcass, said cord let-off mechanism including a let-off roll for said cord, a variable speed direct current motor driving said let-off roll, a resolver having a movable element located in the path of cord for said let-off mechanism to said winding head and engageable with said cord to detect tension variations in said cord, said resolver supplying a signal to said motor which varies with the tension on said cord and causes the speed of said motor to vary with the tension on said cord, a series of idler pulleys over which said cord passes, the movable element of said resolver being an arm pivoted at one end and carrying a movable idler pulley at the other end, said cord passing around said movable idler pulley to form a loop, means biasing said arm to swing in a direction opposite to that which the tension on the cord causes it to swing, said resolver detecting the position of said arm and signaling said motor to supply cord at a rate which will tend to maintain said arm at a preselected operative position, said idler pulley having sequentially
- a. a first range of positions in which said cord supplying means is caused to operate in a reverse direction to withdraw cord,
- b. a second position in which said supplying means is inoperative,
- c. a third range of positions in which said supplying means supplies cord at a rate dependent on the position of said idler pulley within said range, and
- d. a fourth range of positions in which said drum is caused to rotate more slowly.

3. Apparatus for building a raw edge V-belt carcass comprising, a drum for receiving plies of material and wrapping them about said drum to form a cylindrical carcass, means for rotating said drum, a cord let-off mechanism for applying a cord in a helix around said carcass, said cord let-off mechanism including a let-off roll for said cord, a variable speed direct current motor driving said let-off roll, a resolver having a movable element located in the path of cord from said let-off mechanism to said winding head and engageable with said cord to detect tension variations in said cord, said resolver supplying a signal to said motor which varies with the tension on said cord and causes the speed of said motor to vary with the tension on said cord, a series of idler pulleys over which said cord passes, the movable element of said resolver being an arm pivoted at one end and carrying a movable idler pulley at the other end, said cord passing around said movable idler pulley to form a loop, means biasing said arm to swing in a direction opposite to that which the tension on the cord causes it to swing, said resolver detecting the position of said arm and signaling said motor to supply cord at a rate which will tend to maintain said arm at a preselected operative position, said idler pulley having sequentially
- a. a first range of positions in which said cord supplying means is caused to operate in a reverse direction to withdraw cord,
- b. a second position in which said supplying means is inoperative, and
- c. a third range of positions in which said supplying means supplies cord at a rate dependent on the position of said idler pulley within said range.

4. Apparatus as in claim 1 further comprising, means for moving said applicator roll away from said drum, said air-applying means being operable simultaneously with movement of said applicator roll away from said drum.

* * * * *